US008835834B2

(12) United States Patent
Sugiyama et al.

(10) Patent No.: US 8,835,834 B2

(45) Date of Patent: Sep. 16, 2014

(54) MASS SPECTROMETER AND MASS SPECTROMETRY METHOD

(75) Inventors: Masuyuki Sugiyama, Hino (JP); Yuichiro Hashimoto, Tachikawa (JP); Hisashi Nagano, Nishitokyo (JP); Hideki Hasegawa, Tachikawa (JP); Yasuaki Takada, Kiyose (JP); Masuyoshi Yamada, Ichikawa (JP)

(73) Assignee: Hitachi High-Technologies Corporation, Tokyo (JP)

( * ) Notice: Subject to any disclaimer, the term of this patent is extended or adjusted under 35 U.S.C. 154(b) by 305 days.

(21) Appl. No.: 13/383,371

(22) PCT Filed: Jul. 9, 2010

(86) PCT No.: PCT/JP2010/004464

§ 371 (c)(1), (2), (4) Date: Jan. 10, 2012

(87) PCT Pub. No.: WO2011/007528

PCT Pub. Date: Jan. 20, 2011

(65) Prior Publication Data

US 2012/0112059 A1 May 10, 2012

(30) Foreign Application Priority Data

Jul. 15, 2009 (JP) ................................ 2009-166279

(51) Int. Cl.
*B01D 59/44* (2006.01)
*H01J 49/00* (2006.01)

(52) U.S. Cl.
CPC .................................. *H01J 49/004* (2013.01)
USPC ........... 250/281; 250/282; 250/283; 250/287; 250/288; 250/289; 250/290; 250/291; 250/292

(58) Field of Classification Search
USPC ................................. 250/281–283, 287–292
See application file for complete search history.

(56) References Cited

U.S. PATENT DOCUMENTS

| | | | | |
|---|---|---|---|---|
| 5,179,278 | A | 1/1993 | Douglas | |
| 5,420,425 | A | 5/1995 | Bier et al. | |
| 5,783,824 | A | 7/1998 | Baba et al. | |
| 5,847,386 | A * | 12/1998 | Thomson et al. | 250/288 |
| 6,177,668 | B1 | 1/2001 | Hager | |
| 2007/0181804 | A1 * | 8/2007 | Hashimoto et al. | 250/290 |

FOREIGN PATENT DOCUMENTS

| | | | |
|---|---|---|---|
| JP | 2001-176444 | A | 6/2001 |
| JP | 2007-95702 | A | 4/2007 |
| JP | 2007-232728 | * | 9/2007 |
| JP | 2007-232728 | A | 9/2007 |
| JP | 2009-117388 | A | 5/2009 |
| WO | 2008071967 | A2 | 6/2008 |

* cited by examiner

*Primary Examiner* — Jack Berman
*Assistant Examiner* — Meenakshi Sahu
(74) *Attorney, Agent, or Firm* — Mattingly & Malur, PC

(57) ABSTRACT

An object is to measure both cations and anions with high duty cycle. In a mass spectrometer comprising an ion source (1), an ion guide part (31), and an ion trap (32), while ions are being mass-selectively ejected from the ion trap, ions having a polarity reverse to that of the ions trapped in the ion trap are introduced into the ion guide part.

20 Claims, 17 Drawing Sheets

MASS SPECTROMETER AND MASS SPECTROMETRY METHOD

TECHNICAL FIELD

The present invention relates to a mass spectrometer and a method of operating the same.

BACKGROUND ART

An ion trap is a widely used mass spectrometer, accumulates ions, and thereafter ejects the ions mass-selectively. A configuration of the ion trap and a measurement method are described in Patent Documents 2 to 5. In the ion trap, ions introduced from an ion source are released while a mass spectrometry is being performed, which leads to a loss. Thus, there is a problem of low duty cycle. If the ions introduced from the ion source while the mass spectrometry is being performed with the ion trap can be used for the mass spectrometry, the sensitivity of the ion trap can be enhanced. Patent Document 1 describes a method by which the duty cycle is enhanced in the following manner. Specifically, while the mass spectrometry is performed with an ion trap, ions introduced from an ion source are accumulated in a two dimensional multipole electric field formed with multipole rods. Then, the ions are introduced into the ion trap in a step of accumulating the ions in the ion trap. In addition, Patent Document 2 describes a method by which the duty cycle is enhanced by mass-selectively ejecting ions at the same time while accumulating the ions in an ion trap.

PRIOR ART DOCUMENTS

Patent Documents

Patent Document 1: U.S. Pat. No. 5,179,278
Patent Document 2: U.S. Pat. No. 6,177,668
Patent Document 3: U.S. Pat. No. 5,420,425
Patent Document 4: U.S. Pat. No. 5,783,824
Patent Document 5: United States Patent Application Publication No. 2007-0181804

SUMMARY OF THE INVENTION

Problems to be Solved by the Invention

One of objects of the present invention is to measure both cations and anions in turn by using an ion-trap-type mass spectrometer and to enhance duty cycle at that time.

When which one of a positive polarity and a negative polarity has higher efficiency of ionization of a measurement target is unknown, both of a cation measurement and an anion measurement need to be performed. In a case such as a separated specimen measurement using a liquid chromatography or a gas chromatography, chromatogram measurement is required only once to obtain data of the cation measurement and the anion measurement, if the measurement is carried out while performing switching between the cation measurement and the anion measurement in turn with the mass spectrometer. However, there is a problem that a long polarity switching time leads to too few measurement points to perform a quantitative analysis using a mass chromatogram and thus deteriorated measurement accuracy.

The method described in Patent Document 1 describes use of the cations in a measurement sequence using pretrapping, but does not describe a case of alternately measuring ions having mutually reversed polarities. With this method, ions of a reverse polarity to that of ions being measured with the ion trap cannot be accumulated in the multipole electric field. In addition, with the method described in Patent Document 2, the ions with kinetic energy introduced into the ion trap are not sufficiently cooled, and the ions having high kinetic energy at the introduction are ejected regardless of the mass, which causes a noise, resulting in a low S/N. With methods described in Patent Documents 3 to 5, ions introduced from an ion source are released while a mass spectrometry is being performed with an ion trap, which leads to a loss. Thus, the duty cycle is low.

Means for Solving the Problems

By using a mass spectrometer including an ion source configured to generate ions, an ion guide part configured to transport the ions introduced from the ion source, and an ion trap part configured to trap and then mass-selectively eject the ions, ions having a polarity reverse to that of the ions trapped in the ion trap are trapped in the ion guide part in a time period when the ions are mass-selectively ejected from the ion trap part.

An example of a mass spectrometry method includes a mass spectrometer comprising: an ion source configured to generate ions; an ion guide part configured to transport the ions introduced from the ion source; an ion trap part configured to trap and mass-selectively eject the ions introduced from the ion guide part; a detector configured to detect the ions ejected from the ion trap part; and a controller, and based on voltage control performed on the ion guide part and the ion trap part, the controller introduces ions having a polarity reverse to that of the ions trapped in the ion trap part into the ion guide part in a time period when the ions are mass-selectively ejected from the ion trap part.

An example of a mass spectrometry method includes a mass spectrometry method comprising: a step of introducing first ions into the ion guide from the ion source; a step of introducing the first ions into the ion trap from the ion guide; an analyzing step of ejecting the first ions from the ion trap and analyzing the first ions; and a step of accumulating second ions having a reverse polarity to that of the first ions, in the ion guide in the analyzing step.

In order to introduce the ions into the ion trap from the ion guide, an electrode for controlling ion passage may be provided between the ion guide part and the ion trap part, and polarities of an offset potential of the multipole rod electrode of the ion guide part and an offset potential of the ion trap part may be set reverse to each other with respect to a potential of the electrode for controlling the ion passage. Thereby, the ions are introduced into the ion trap from the ion guide. Alternatively, an alternating voltage may be applied to the electrode for controlling the ion passage so that the magnitude of a pseudo-potential generated due to the alternating voltage is set to be lower than an offset potential of the ion guide part and higher than an offset potential of the ion trap part. Thereby, the ions are introduced into the ion trap from the ion guide. Still alternatively, mutually reversed voltages may be respectively applied to a first electrode adjacent to the ion guide part and a second electrode adjacent to the ion trap part which are provided between the ion guide part and the ion trap part, and thereby the ions are introduced into the ion trap part from the ion guide part.

Effect of the Invention

According to the present invention, high duty cycle can be obtained when both of cations and anions are measured in turn with an ion trap mass spectrometer.

MODES FOR CARRYING OUT THE INVENTION

Embodiment 1

Figure 1:
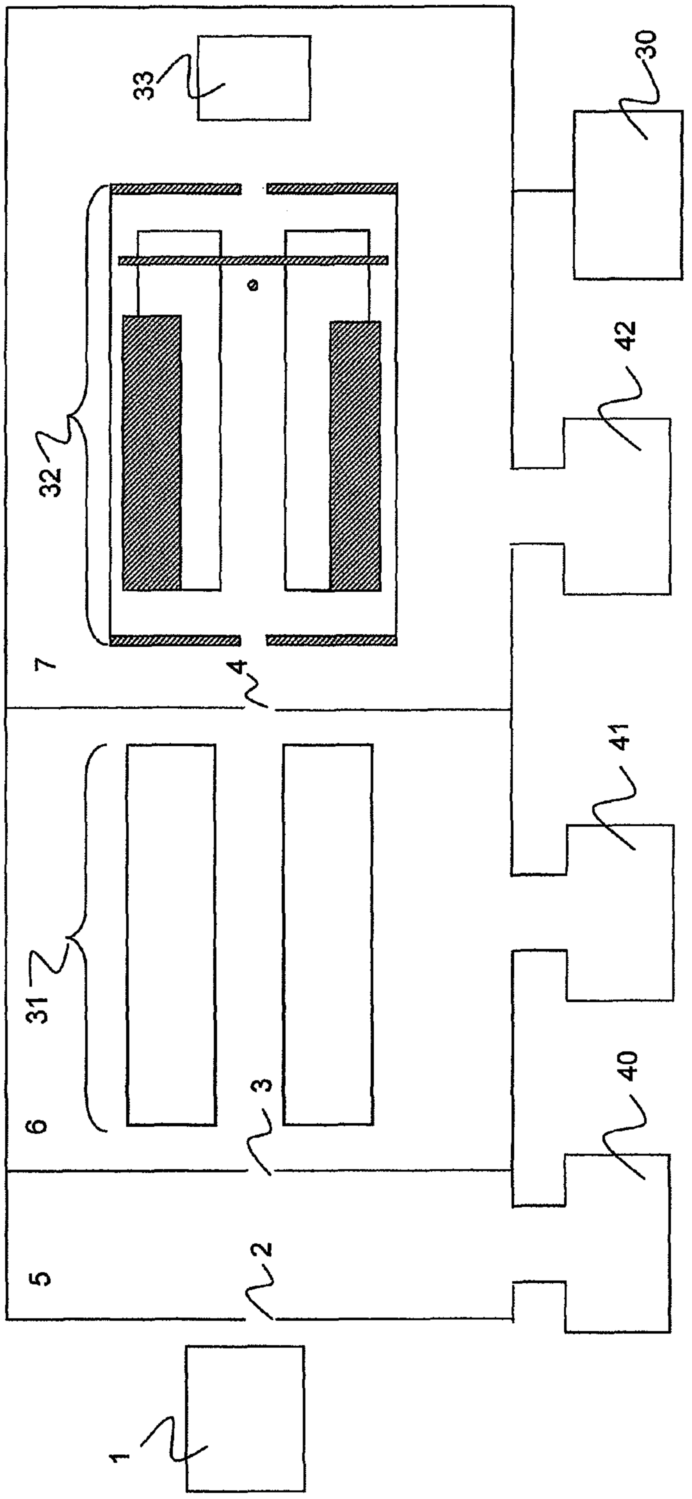
FIG. 1 shows an example of a configuration of a mass spectrometer.

FIG. 1 is a configuration diagram showing one embodiment of a mass spectrometer of the present invention. Note that a mechanism of introducing a buffer gas and the like is omitted for simplicity. Ions generated by an ion source 1, such as an electrospray ion source, an atmospheric pressure chemical ion source, an atmospheric pressure photoion source, an atmospheric pressure matrix-assisted laser desorption ion source, or a matrix-assisted laser desorption ion source, are introduced into a first differential exhaust unit 5 through a first orifice 2. The ion source such as the electrospray ion source, the atmospheric pressure chemical ion source or the atmospheric pressure photoion ion source can generate ions in both the polarities at the same time by using two whiskers. Specifically, a positive high voltage of 500 V to 8000 V is applied to one of the whiskers, and a negative high voltage of 500 V to 8000 V is applied to the other. The first differential exhaust unit 5 is evacuated with a pump 40. The ions introduced into the first differential exhaust unit 5 are introduced into a second differential exhaust unit 6 through an entrance-end electrode 3 of an ion guide part. The second differential exhaust unit 6 is evacuated with a pump 41 and maintained at a pressure of approximately $10^{-4}$ Torr to $10^{-2}$ Torr ($1.3\times10^{-2}$ Pa to 1.3 Pa). An ion guide part 31 is installed in the second differential exhaust unit 6.

Figure 2:
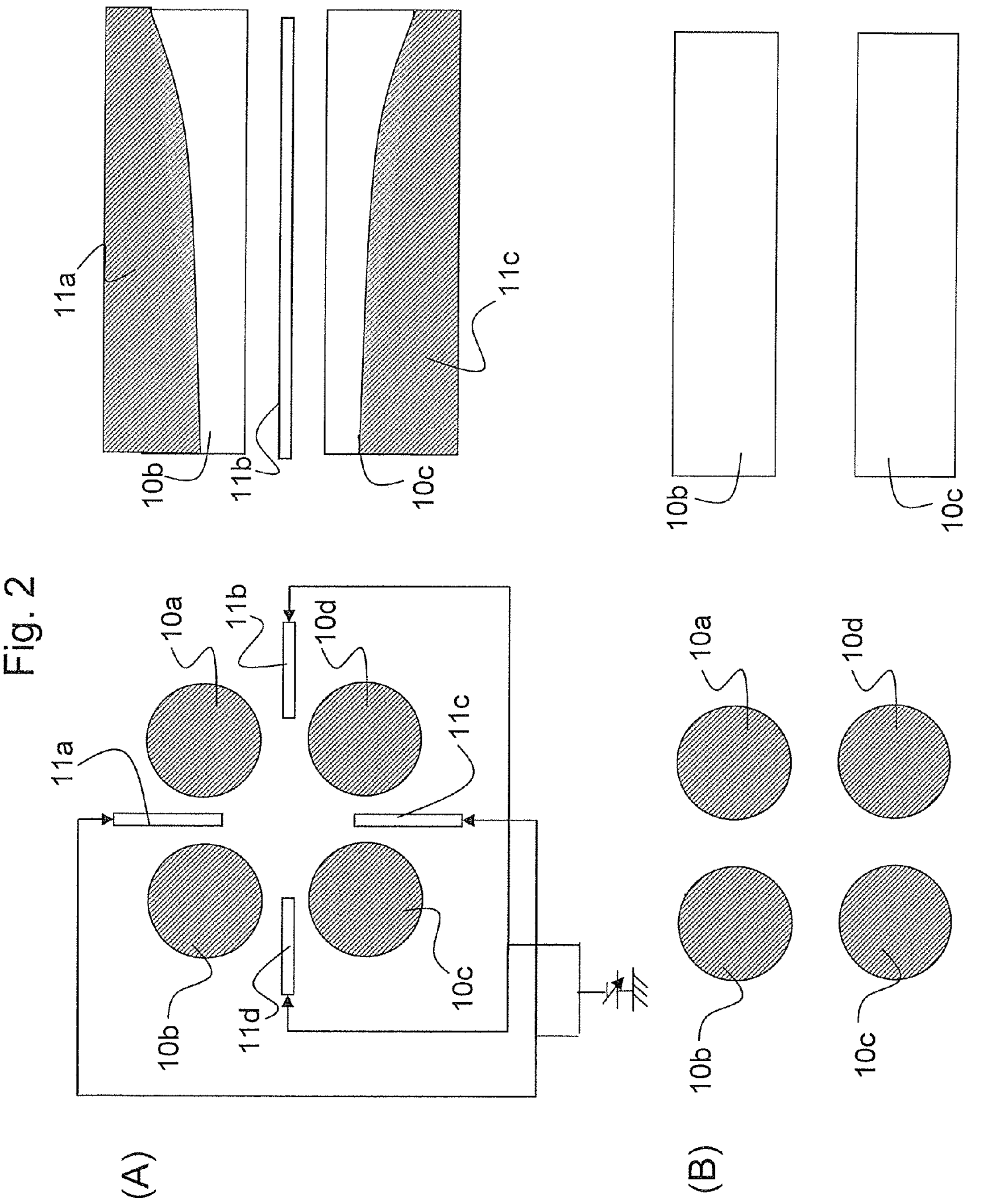
FIG. 2 shows an example of a configuration of an ion guide part.

FIG. 2 shows a configuration of the ion guide part 31. The ion guide part 31 includes quadrupole rod electrodes 10. Herein, an exit-end electrode 4 of the ion guide part 31 also serves as a vacuum barrier with a high-vacuum chamber, and the entrance-end electrode 3 of the ion guide part serves as a vacuum barrier with the first exhaust unit. RF voltages generated by an RF power source and having alternately inversed phases are applied to the quadrupole rod electrodes 10. The RF voltages have typical voltage amplitude of approximately several hundred volts to 5000 V and a frequency of 500 kHz to 2 MHz. In a configuration in Part (A) of FIG. 2, plate-shaped vane electrodes 11 are inserted in gaps between quadrupole rods. Each of the vane electrodes 11 has a shape in which the distance between an end face thereof and the center of the quadrupoles is the shortest at the entrance of the ion guide part and increases toward the exit of the ion guide part. By applying a DC voltage to the vane electrodes 11, a gradient electric field can be generated on the center axis of the ion guide part. In contrast, vane electrodes are not inserted in gaps between the quadrupole rods in a configuration in Part (B) of FIG. 2.

Figure 3:
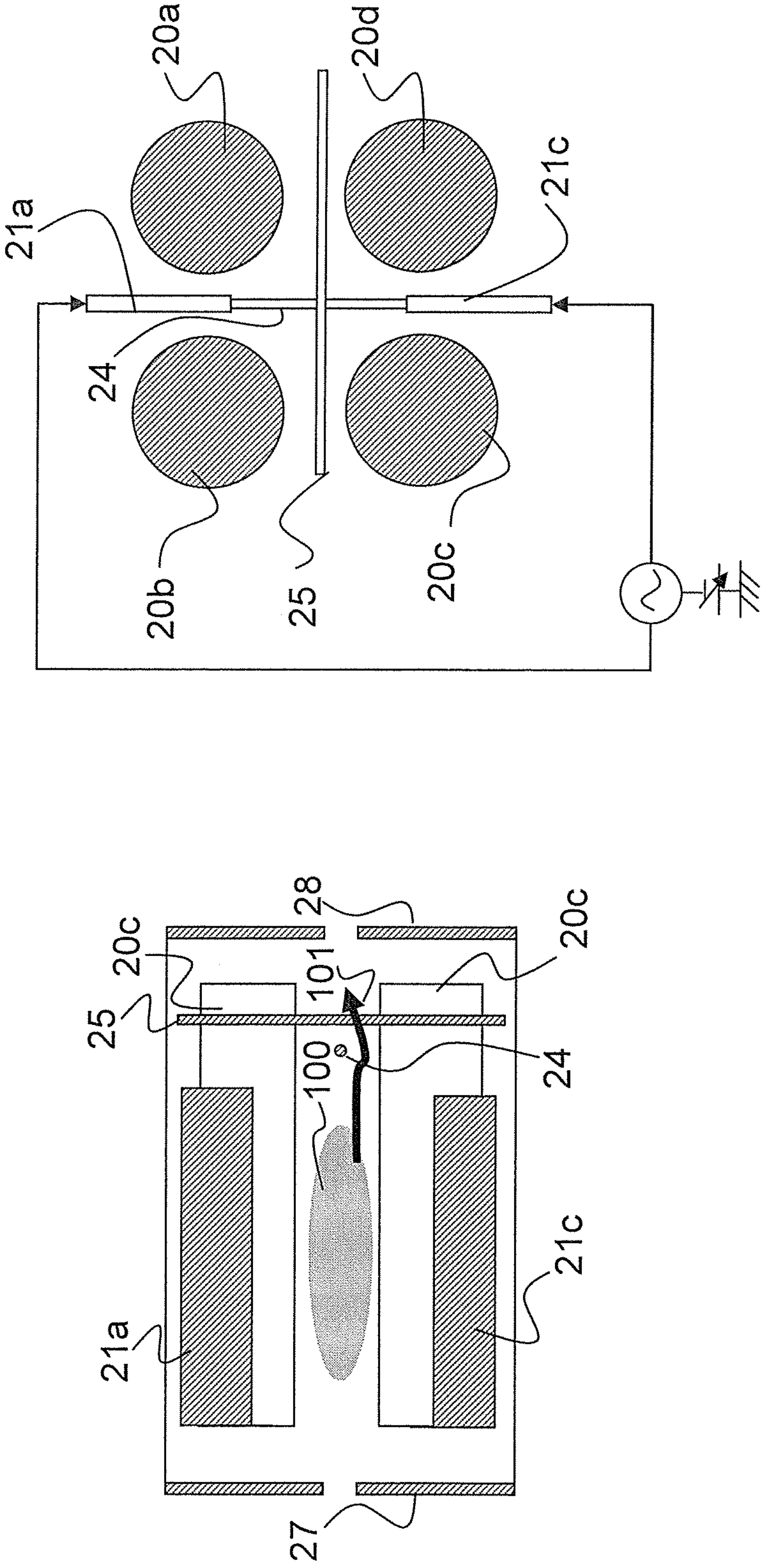
FIG. 3 shows an example of a configuration of an ion trap part.

A high-vacuum chamber 7 is evacuated with a pump 42, maintained at $10^{-4}$ Torr or lower, and has an ion trap part 32 and a detector 33 installed therein. FIG. 3 shows an example of a configuration of the ion trap part 32. The illustrated ion trap part 32 includes an entrance-end electrode 27, an exit-end electrode 28, quadrupole rod electrodes 20, vane electrodes 21 inserted in gaps between quadrupole rod electrodes, a trap wire electrode 24, and an extraction wire electrode 25. Trapping RF voltages generated by the RF power source and having alternately inversed phases are applied to the quadrupole rod electrodes 20. The RF voltages have typical voltage amplitude of approximately several hundred V to 5000 V, and a frequency of 500 kHz to 2 MHz. In addition, although an offset potential of a certain voltage (−100 V to 100 V) might be applied to the quadrupole rods, embodiments below show a value at the time of the offset potential of 0 V as a value of voltage to be applied to the electrodes. The ion trap part 32 has a buffer gas introduced therein and is maintained at approximately $10^{-4}$ Torr to $10^{-2}$ Torr ($1.3\times10^{-2}$ Pa to 1.3 Pa). Although an example using the wire electrodes is herein shown as the configuration of the ion trap part 32, what is required is a configuration capable of trapping and mass-selectively ejecting ions. A controller 30 is designed to control voltages and temperatures of the components of the mass spectrometer.

Figure 4:
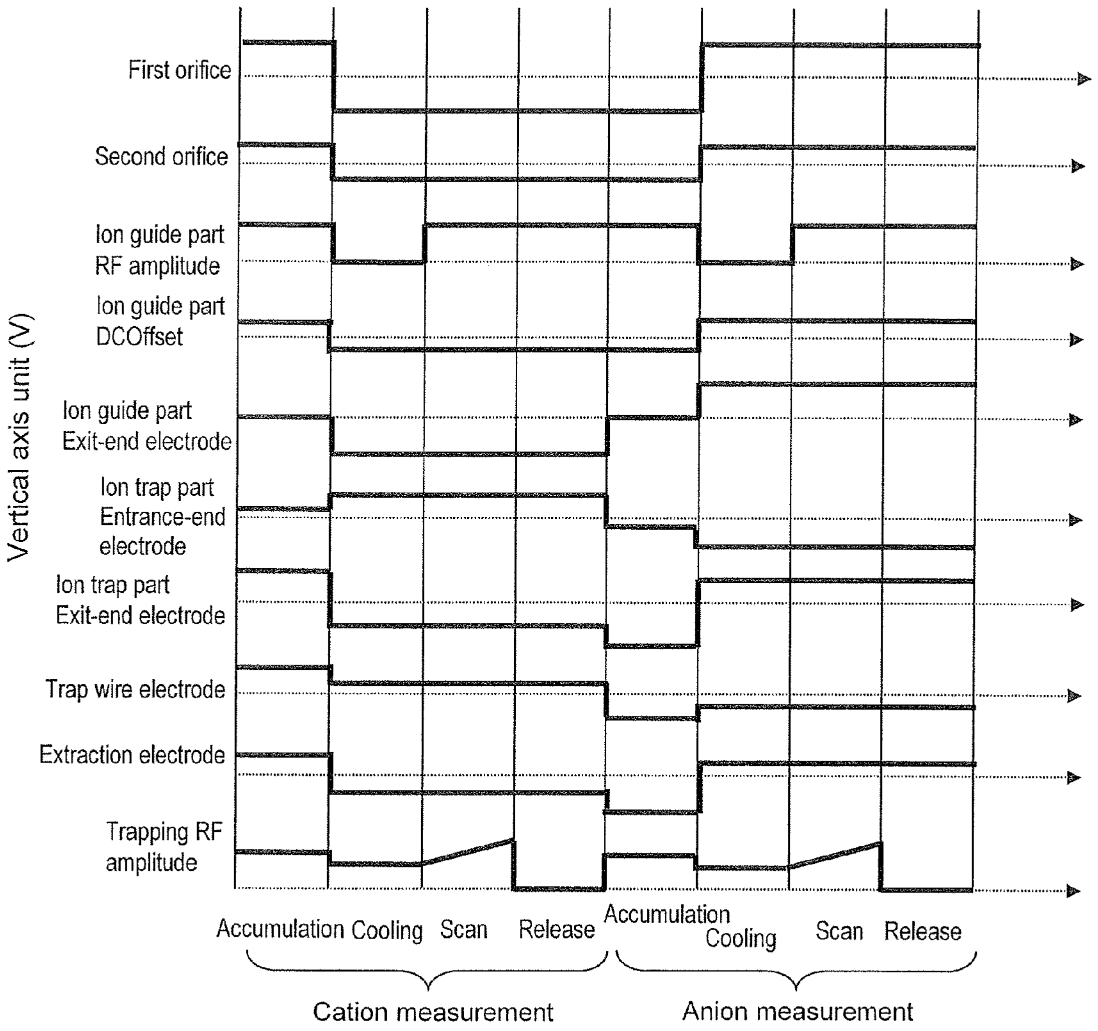
FIG. 4 shows an example of measurement sequences.

Measurements are carried out, while four sequences of an accumulating step, a cooling step, a mass scanning step, and a releasing step are repeated for each polarity ions. FIG. 4 shows measurement sequences in a case of alternately measuring cations and anions. In FIG. 4, first four sequences correspond to a measurement in which the anions are accumulated in the ion guide part 31, and the cations are mass analyzed in the ion trap part 32, and second four sequences correspond to a measurement in which the cations are accumulated in the ion guide part 31, and the anions are subjected to the mass spectrometry in the ion trap part 32. Hereinbelow, a description is given of voltage application to the electrodes at the time of the cation measurement. At the time of the anion measurement, the polarity of voltages to be applied may be inverted.

In the accumulating step, ions accumulated in the ion guide part 31 in a previous sequence and ions introduced from the ion source in the accumulating step are accumulated in the ion trap. A potential of the exit-end electrode 4 of the ion guide part is set to be lower than an offset potential of the ion guide part 31 to eject the ions from the ion guide part 31 toward the ion trap part. The entrance-end electrode 27 of the ion trap part 32 is set to have a lower offset potential than that of the ion guide part 31. In an example of voltage application to the other electrodes, the vane electrodes 11 are set at approximately 0 V; the trap wire electrode 24, 20 V; the extraction wire electrode 25, 20 V; and the exit-end electrode 28, 20 V. A pseudo-potential is generated in a radial direction of the quadrupoles due to the trapping RF voltage. In addition, a DC potential is generated in a direction of the center axis of the quadrupole electric field by the entrance-end electrode 27 and the trap wire electrode 24. For this reason, the ions introduced into the ion trap part 32 are trapped in a region 100 surrounded by the entrance-end electrode 27, the quadrupole rod electrodes 20, the vane electrodes 21, and the trap wire electrode 24. A time of the accumulating step depends on an amount of ions, but in general is approximately 10 ms to 1000 ms.

As in Part (A) of FIG. 2, the vane electrodes 11 are inserted in the gaps between the quadrupole rod electrodes 10 of the ion guide part 31, and a vane electrode shape is formed in such a manner that a gradient electric field is generated on the center axis of the ion guide part 31. With this configuration, even though the ion guide part 31 has a high pressure, the ions trapped in the ion guide part 31 can be moved to the ion trap part 32 in a short time (0.1 ms to 10 ms). In contrast, the configuration in Part (B) of FIG. 2 has an advantage of a smaller number of parts than that in the configuration of Part (A) of FIG. 2, but has a problem that the ions near the entrance-end electrode 3 are not ejected from the ion guide part 31 when the ion guide part 31 has the high pressure. After the ions trapped in the ion guide part 31 are introduced into the ion trap part, ions introduced from the ion source are transmitted through the ion guide part 31 and then introduced into the ion trap part 32.

In the cooling step, the ions trapped in the ion trap part 32 are cooled by collision with the buffer gas. This can prevent ions having a large kinetic energy from being ejected regardless of the mass in the mass scanning step. In an example of voltage application to the ion trap part 32, the entrance-end electrode 27 is set at approximately 10 V; the vane electrodes 21, 0 V; the trap electrode 24, 20 V; the extraction electrode 25, 20 V; and the exit-end electrode 28, 20 V. The amplitude of the RF voltage applied to the quadrupole rod electrodes of the ion guide part 31 is changed to zero to release all the ions trapped in the ion guide part 31. This can prevent the ions introduced into the ion guide part 31 in the previous sequence from staying in the ion guide part 31. The polarity of the ion source 1 and the electrodes from the ion source to the entrance of the ion guide part 31 is inverted. The switching of the polarity of the ion source may be performed in the mass scanning step. However, 1 ms to 10 ms is required for stabilization of the ion source after the switching of the polarity of a power source, and the ions cannot be accumulated in this period. Thus, a loss occurs. The loss can be reduced by switching the polarity of the ion source in the cooling step in which the ions are released from the ion guide part 31.

In the mass scanning step, an auxiliary alternating voltage (having amplitude of 0.01 V to 100 V and a frequency of 10 kHz to 500 kHz) is applied between the vane electrodes 21. In addition, a voltage of approximately 1 V to 30 V is applied to the trap wire electrode 24. By changing the trapping RF voltage amplitude, the ions are resonantly and mass-selectively ejected. FIG. 3 schematically shows a trajectory 101 of the ions ejected at this time. A relation between an m/z of the ions ejected at this time and the trapping RF voltage amplitude (V) is expressed with the following equation.

$$m/z = \frac{4\ \mathrm{eV}}{q_{ej} r_o^2 \Omega^2} \quad \text{[Formula 1]}$$

Herein, e denotes a charge quanta; $r_o$, a distance between each of the rod electrodes 20 and the center of the quadrupoles; and Ω, an angular frequency of the trapping RF voltage. In addition, $q_{ej}$ is a numerical value uniquely calculable from a ratio between the angular frequency Ω of the trapping RF voltage and an angular frequency ω of the auxiliary alternating voltage.

The ions mass-selectively ejected from the ion trap part 32 are detected by the detector 33. In the meantime, ions having a reverse polarity to that of the ions under the mass spectrometry in the ion trap part 32 are introduced into the ion guide part 31. The ions introduced into the ion guide part 31 are trapped in the axial direction due to the DC potential between the exit-end electrode 4 and the entrance-end electrode 3 and in the radial direction due to the pseudo-potential generated by the quadrupole rod electrodes 10. By setting the RF voltage amplitude of the ion guide part 31 at a value causing a q value of 0.9 or larger of ions having a smaller m/z than an analysis target can be released, and thus an influence of a space charge can be reduced. Alternatively, to prevent the space charge in the ion trap part 32, feedback may be performed in a period when the ions are accumulated in the ion guide part 31, based on the total amount of the ions detected by the detector 33.

In the releasing step, the trapping RF voltage of the ion trap part 32 is changed to zero to eject all the ions to outside the trap. A time of the releasing step is approximately 0.1 ms to 10 ms. Thereafter, the polarity of the electrodes of the ion trap part 32 and the detector 33 is switched. The voltages applied to the electrodes from the ion source 1 and the ion guide part 31 are the same as those in the mass scanning step. Ions introduced during a releasing time are also trapped in the ion guide part 31.

A description is given of the effect of the present invention. Firstly, duty cycle without pretrapping in the ion guide part 31 is calculated. The mass scanning step is represented by s; the releasing time, e; the cooling step, c; and an accumulation time, t. Assume that a time required for stabilizing the ion source is 0 ms. Also assume that a certain amount of ions are always introduced from the ion source. The duty cycle is as follows.

$$\frac{t}{e+c+t+s} \quad \text{[Formula 2]}$$

Since ions introduced from the ion source in periods except the mass scanning step, the releasing time, the cooling step, and the time of accumulating ions in the ion trap are released, the duty cycle is expressed as in (Formula 2). On the assumption that the scanning step is 200 ms long, the releasing time is 5 ms, the cooling step is 10 ms long, and the accumulating time is 50 ms, the duty cycle is 19%.

Next, ion usage efficiency in a case of application of the present invention will be shown. Any ion introduced from the ion source in periods except the cooling step can be used for the analysis.

$$\frac{t+s+e}{t+c+s+e} \quad \text{[Formula 3]}$$

The duty cycle is expressed as in (Formula 3). On the assumption that the scanning step is 200 ms long, the releasing time is 5 ms, the cooling step is 10 ms long, and the accumulating time is 50 ms, the duty cycle is 96%. When the ions trapped in the ion guide part 31 are not released in the cooling step, any introduced ions in the cooling step can be used for the analysis. Thus, the duty cycle is 100% in principle. However, some ions introduced from the ion source 1 might still stay in the ion guide part 31, and thus information on fluctuation over time of the ions generated in the ion source is lost, for example, information on a holding time of LC-MS.

Figure 5:
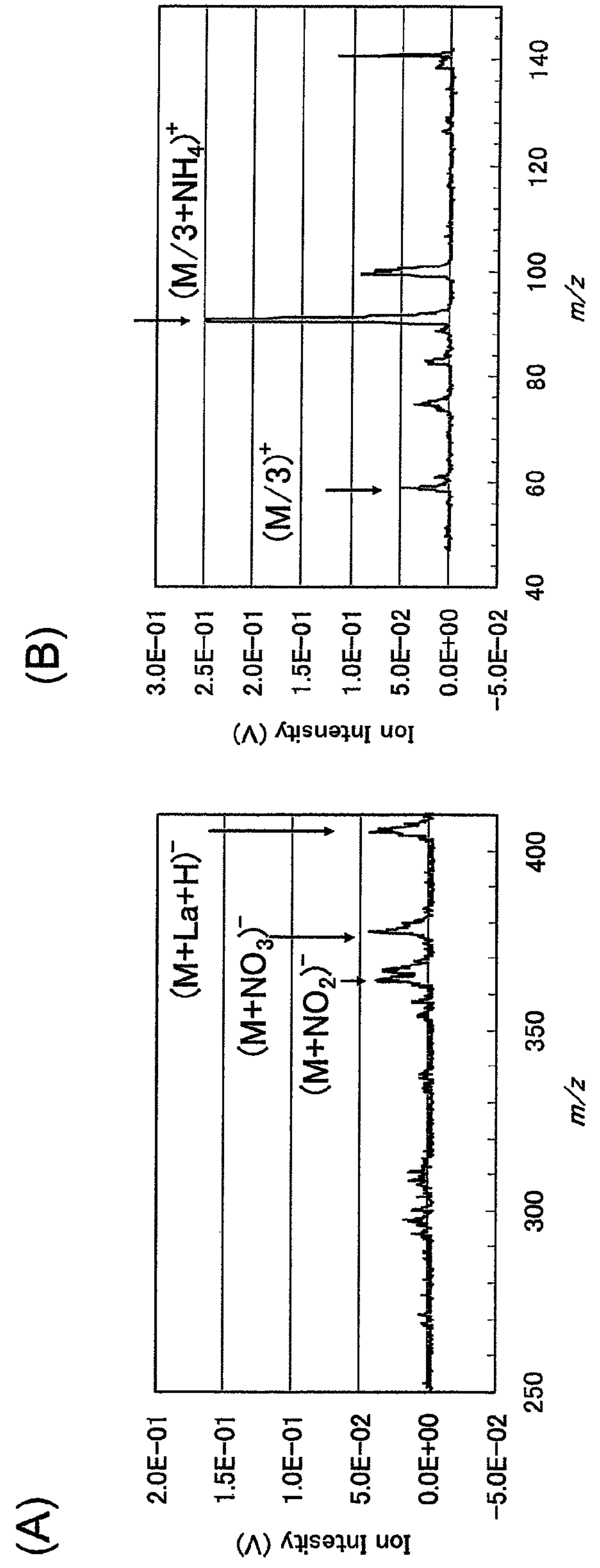
FIG. 5 shows graphs of mass spectra.

FIG. 5 shows mass spectra measured while the present invention is performed. The measurements are carried out under the condition that the time of switching between the cations and the anions is 0.5 seconds. In Part (A) of FIG. 5, triacetone triperoxide (TATP) is detected in the cation measurement. In part (B) of FIG. 5, pentaerythritol tetranitrate (PETN) is detected in the anion measurement. In each of the mass spectra, ions of a specimen to be measured are observed with a high sensitivity.

Embodiment 2

Figure 6:
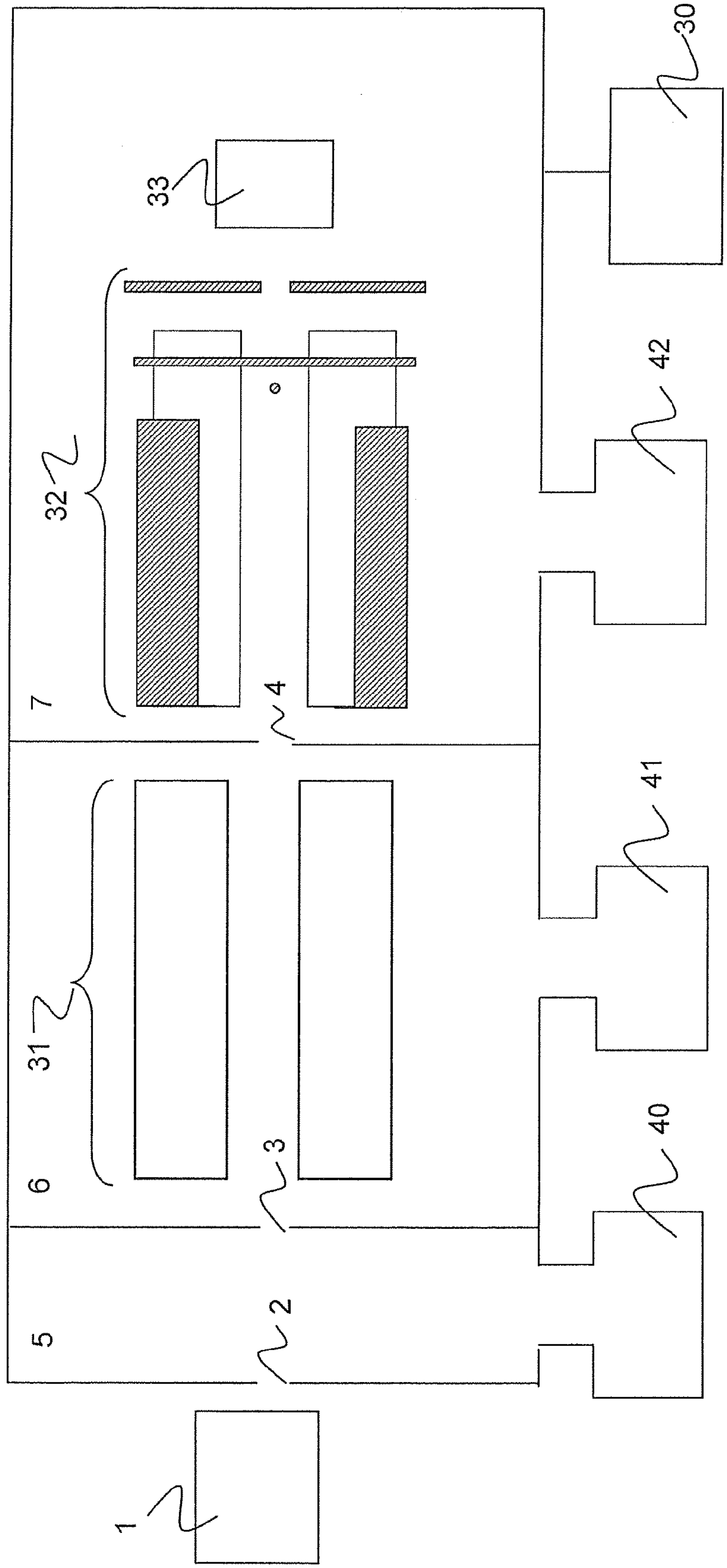
FIG. 6 shows an example of a configuration of a mass spectrometer.
Figure 7:
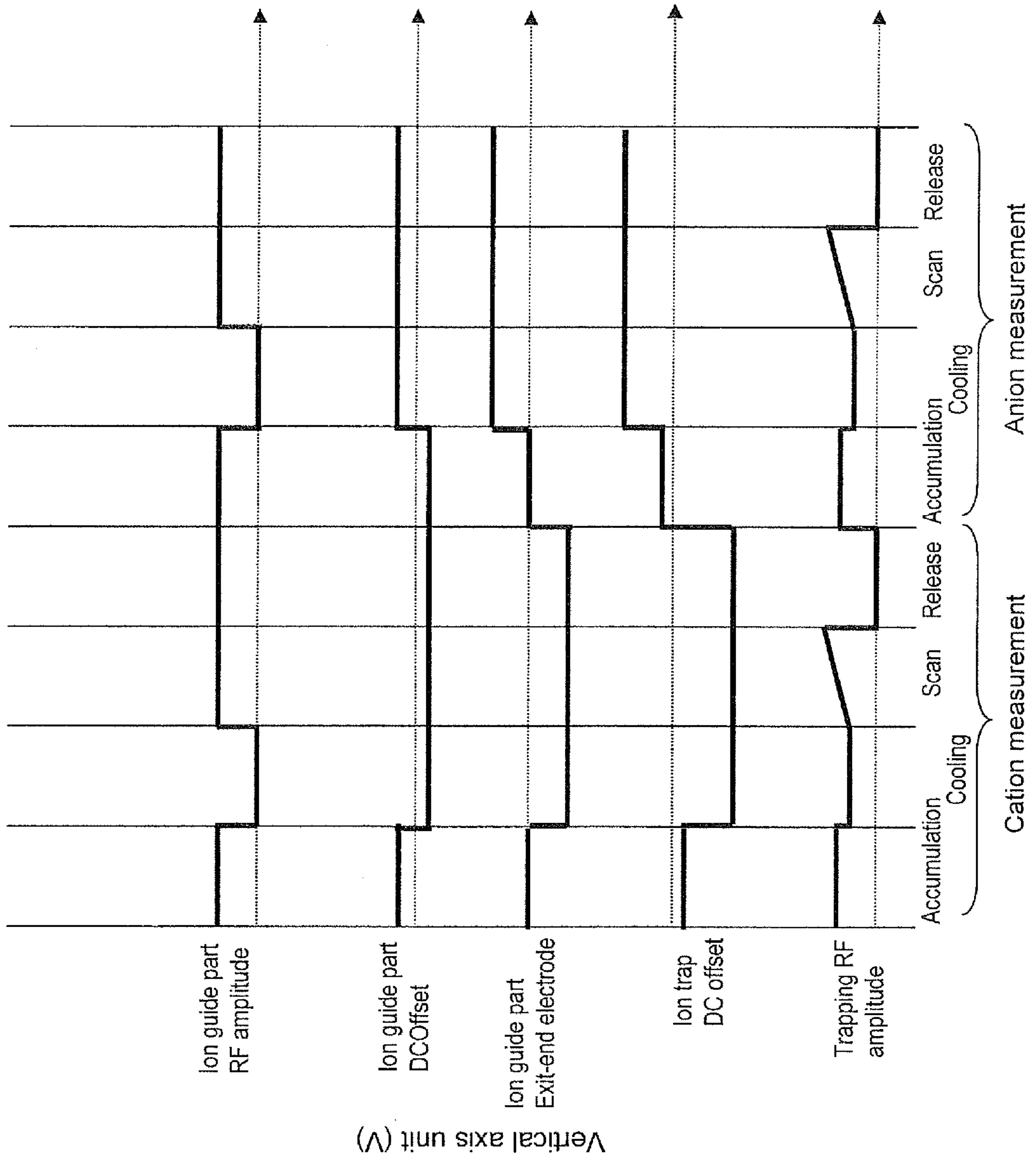
FIG. 7 shows an example of measurement sequences.

FIG. 6 shows an apparatus configuration in Embodiment 2. The ion trap part 32 is arranged in the high-vacuum chamber 7 and is maintained at 0.1 mTorr to 10 mTorr. The exit-end electrode 4 of the ion guide part also serves as the entrance-end electrode of the ion trap in this configuration, but a configuration of other components is the same as that in Embodiment 1. FIG. 7 shows measurement sequences. The voltage application from the ion source to the ion guide part 31 is the same as in Embodiment 1. When the offset potential of the quadrupole rod electrodes of the ion trap part 32 is changed, voltages of the other electrodes of the ion trap part 32 are controlled in conjunction with the voltages so that potential differences from the offset potentials of the quadrupole rod electrodes 20 can be the same as the applied voltages in Embodiment 1. Hereinbelow, a description is given of voltage application to the electrodes at the time of the cation measurement. At the time of the anion measurement, the polarity of voltages to be applied may be inverted. At the time of the cation measurement, ions are introduced into the ion trap part 32 from the ion guide part 31 in an accumulating step while the offset potential of the ion trap part 32 is set to be approximately 1 V to 20 V lower than that of the exit-end electrode 4 of the ion guide part 31 and the offset potential of the ion guide part 31 is set to be approximately 1 V to 20 V higher than that of the exit-end electrode 4 of the ion guide part 31. In addition, in a cooling step and a mass scanning step, an offset potential of the ion trap part 32 is set to be approximately 10 V to 200 V lower than that of the exit-end electrode 4 of the ion guide part 31 to trap ions inside the ion trap. In contrast, an offset potential of the ion guide part 31 is set to be approximately 10 V to 200 V higher to accumulate, in the ion guide, anions introduced from the ion source. A voltage to be applied to the detector 33 may be controlled in accordance with the change of the offset potential of the ion trap part 32. However, since a high voltage of −2 kV to 6 kV is generally applied to the detector 33, a certain voltage may be applied regardless of the offset potential. There is almost no influence of the offset potential.

The apparatus configuration is simpler than in Embodiment 1 and has an advantage that a smaller number of electrodes are required. On the other hand, the measurement sequences are complicated to some extent.

Embodiment 3

Figure 8:
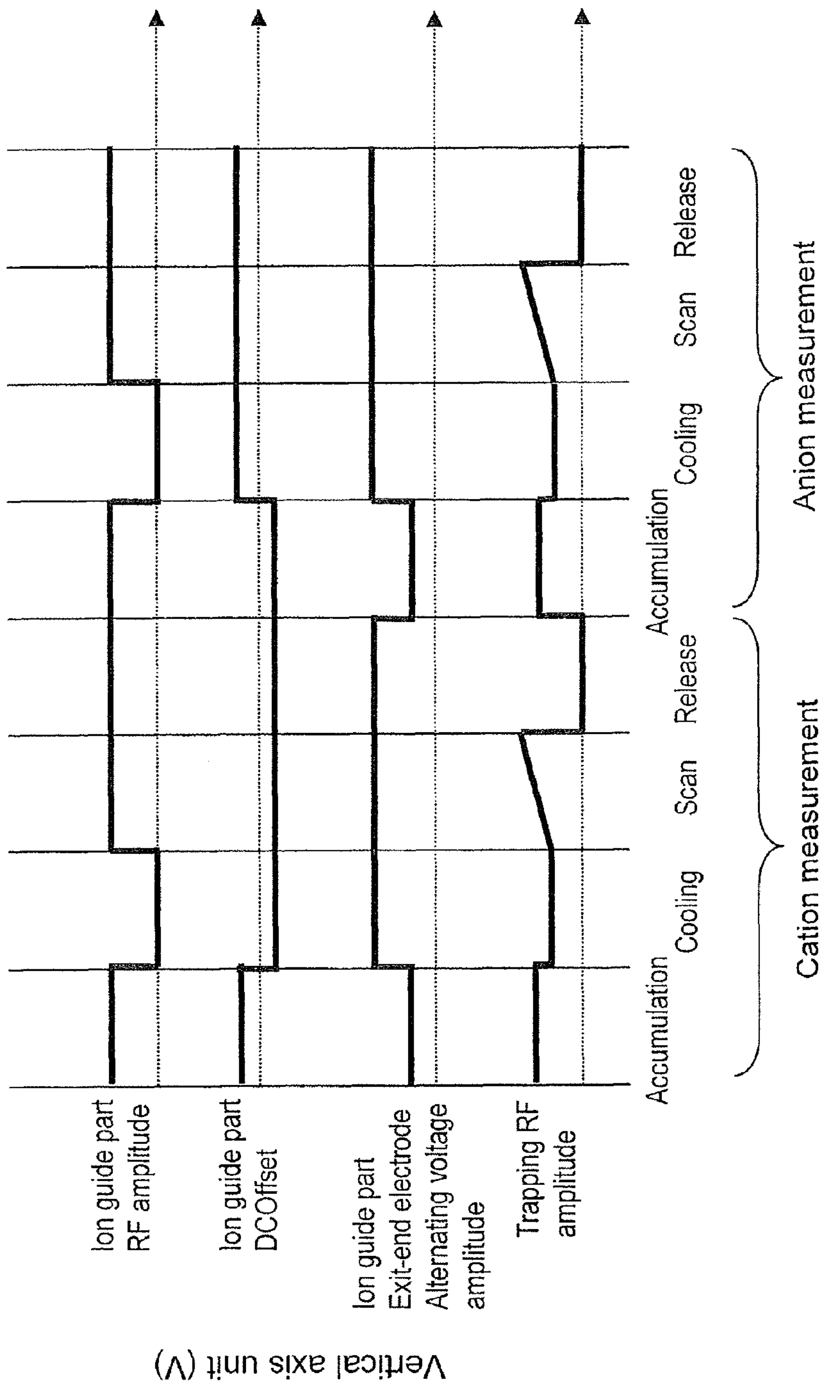
FIG. 8 shows an example of measurement sequences.

Embodiment 3 shows an example of a sequence operation in a case of using the same apparatus as in Embodiment 2. FIG. 8 shows measurement sequences. Control sequences for the components except the exit-end electrode 4 of the ion guide part are the same as in Embodiment 1.

When an alternating voltage of 100 kHz to 4 MHz is applied to the exit-end electrode 4 of the ion guide part, a pseudo-potential expressed with (Formula 4) is formed near the exit-end electrode.

$$\psi = \frac{e}{4m\Omega^2}\overline{E^2} \qquad \text{[Formula 4]}$$

Herein, e denotes an electric quanta; m, an m/z of ions; Ω, a frequency of the alternating voltage; $\overline{E}$, an electric field averaged in time.

In a mass scanning step, a releasing step, and a cooling step, the magnitude of the pseudo-potential of the exit-end electrode 4 is set to be higher than an offset potential of the ion guide part 31, so that ions introduced into the ion guide part 31 from the ion source 1 are trapped in the ion guide part 31. In an accumulating step, the magnitude of the pseudo-potential of the exit-end electrode 4 of the ion guide part is set to be lower than the offset potential of the ion guide part 31 and higher than an offset potential of the ion trap part 32, and thereby ions are introduced into the ion trap part 32 from the ion guide part 31 to be accumulated in the ion trap. The magnitude of the pseudo-potential depends on the m/z of the ions. Thus, adjusting alternating voltage amplitude in accordance with a range of the m/z of the measured ions makes it possible to trap the ions in a wider m/z range with high efficiency. In the accumulating step, introducing a neutral gas (helium, nitrogen, argon, or the like) into the ion trap part 32 from a pulse valve makes it possible to enhance trapping efficiency in accumulating the ions in the trap.

The apparatus configuration is simpler than in Embodiment 1 and has an advantage that a smaller number of electrodes are required. On the other hand, the measurement sequences are complicated to some extent.

Embodiment 4

Figure 9:
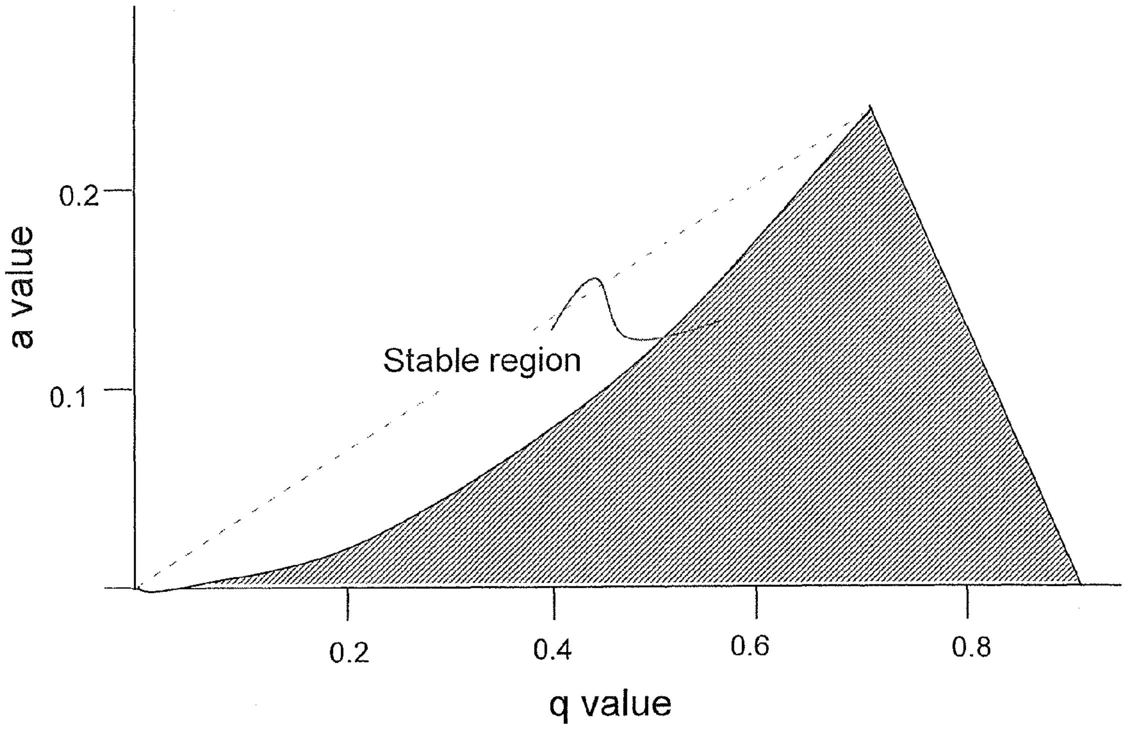
FIG. 9 is a stability diagram.

An apparatus configuration and measurement sequences are the same as in Embodiment 1, and thus a description thereof is omitted. In a mass scanning step, a releasing step, and an accumulating step, in which ions are introduced into the ion guide part from the ion source 1, quadrupole DC voltages are applied to the quadrupole rod electrodes 10 in the ion guide part 31 so that mutually opposed rod electrodes can have the same phase and mutually adjacent rod electrodes can have mutually reversed phases. At this time, a range of an m/z of ions accumulated in the ion guide part 31 is limited to within a stability diagram in FIG. 9. Herein, a q value is a value given with Equation 1, and an a value is a value given with the following (Formula 5).

$$a = \frac{8eU}{mr_o^2\Omega^2} \qquad \text{[Formula 5]}$$

By controlling trapping RF voltage amplitude and quadrupole DC voltage amplitude of the ion guide part 31, the range of the m/z of the ions to be accumulated in the ion guide part 31 can be limited to only a range including ions to be analyzed. Alternatively, instead of applying the quadrupole DC voltage, applying an alternating voltage of a specific frequency to mutually opposed ones of the quadrupole rod electrodes 10 or vane electrodes 11 makes it possible to selectively release, from the ion guide part 31, ions having an m/z causing resonance with the frequency of the applied voltage. Still alternatively, applying voltages of waveforms of overlapped resonance frequencies of ions outside the m/z range of the analysis target to the mutually opposed ones of the quadrupole rod electrodes 10 or the vane electrodes 11 makes it possible to release ions outside the m/z range of the analysis target and thus accumulating only ions in the m/z range of the analysis target, in the ion guide.

Too much amount of ions accumulated in the ion trap part 32 causes a problem such as shifting of a mass axis of a mass spectrum due to an influence of a space charge. However, the method in this embodiment can avoid the influence of the space charge, because the range of ions to be accumulated in the ion guide part is limited.

Embodiment 5

Figure 11:
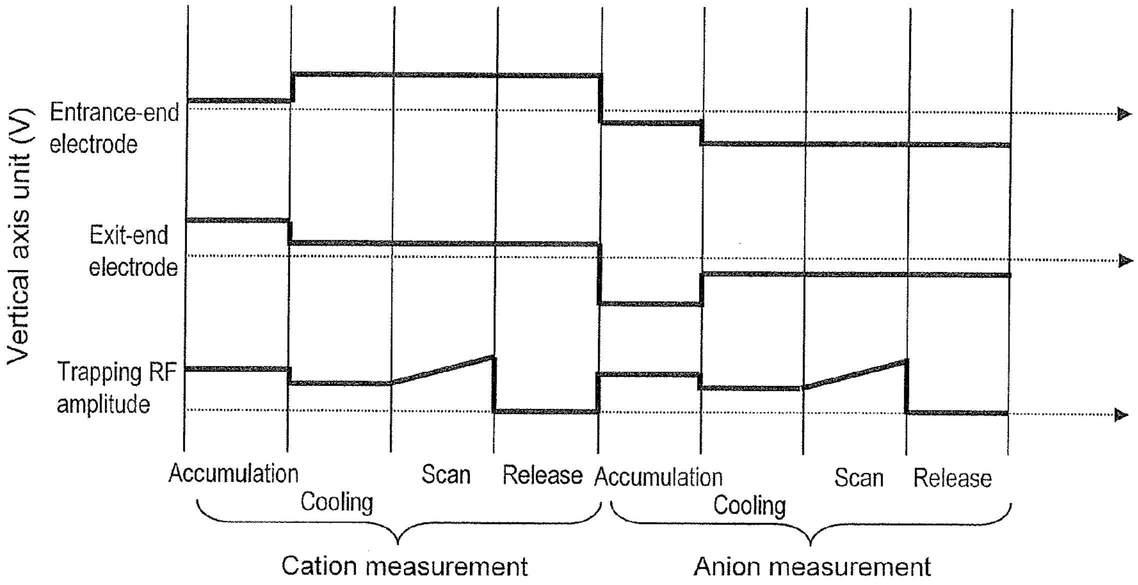
FIG. 11 shows an example of measurement sequences.

An apparatus configuration except the ion trap part 32 and measurement sequences are the same as in Embodiment 1, and thus a description thereof is omitted. The ion trap part 32 is arranged in the high vacuum chamber 7 and maintained at $10^{-4}$ Torr to $10^{-2}$ Torr ($1.3\times10^{-2}$ Pa to 1.3 Pa). FIG. 11 shows measurement sequences in the ion trap part 32. Hereinbelow, a description is given of voltage application to electrodes at the time of the cation measurement. At the time of the anion measurement, the polarity of voltages to be applied may be inverted.

In an accumulating step, a trapping RF voltage (having amplitude of 100 V to 5000 V and a frequency of 500 kHz to 2 MHz) is applied to the quadrupole rod electrodes 20. In an example of voltage application to the other electrodes, the entrance-end electrode 27 is set at 5 V to 20 V, and the exit-end electrode 28 is set at 10 V to 50 V. A pseudo-potential is generated in the radial direction of a quadrupole electric field due to the trapping RF voltage, and a DC potential is generated between the entrance-end electrode 27 and the exit-end electrode 28 in the direction of the center axis of the quadrupole electric field. For this reason, ions introduced from the ion guide part 31 are trapped in a region 100 surrounded by the entrance-end electrode 27, the quadrupole rod electrodes 20, and the exit-end electrode 28. Next, in a mass scanning step, an auxiliary alternating voltage (having amplitude of 0.01 V to 1 V and a frequency of 10 kHz to 500 kHz) is applied between mutually opposed ones (a, c) of the quadrupole rod electrodes 20.

Figure 10:
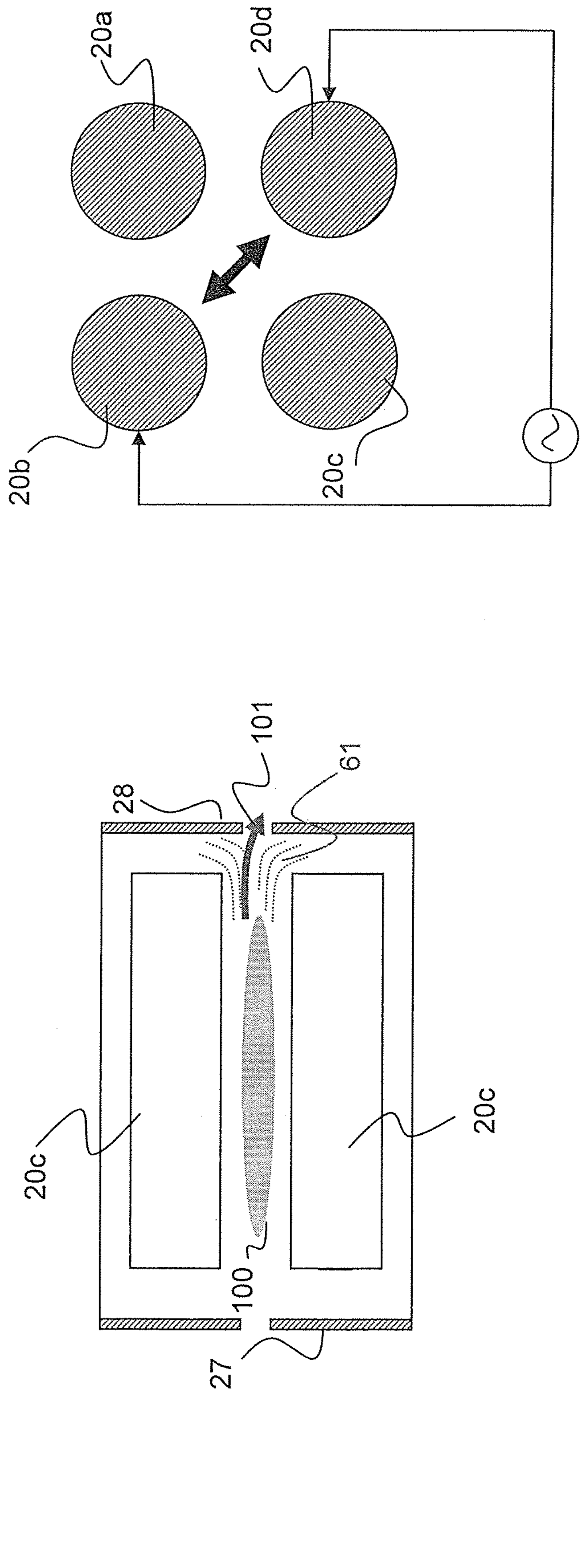
FIG. 10 shows an example of an ion trap part.

In an example of voltage application to the other electrodes, the entrance-end electrode 27 is set at 10 V to 50 V. Ions excited in the radial direction due to the auxiliary alternating voltage are ejected in the axial direction due to a fringing field between ends of the quadrupole rod electrodes 20 and the exit-end electrode 28. FIG. 10 schematically shows a trajectory 101 of the ions ejected at this time. A too low voltage of the exit-end electrode 28 leads to ejection of unexcited ions together from the ion trap part, while a too high voltage leads to a decrease of ejection efficiency. For this reason, the voltage of the exit-end electrode 28 is set at a voltage at which only ions resonantly excited due to the auxiliary alternating voltage are ejected from the ion trap part and non-resonantly excited ions are not ejected therefrom. A typical voltage is approximately 5 V to 30 V. By scanning trapping RF voltage amplitude from lower one (100 V to 1000 V) to higher one (500 V to 5000 V), a mass spectrum can be obtained. The duration of a mass scanning time is approximately 10 ms to 500 ms and almost proportional to a range of a mass to be desirably detected. Lastly, the trapping RF voltage is changed to zero in a releasing step to release all the ions to outside the trap. A time of the releasing step is approximately 1 ms.

The configuration in Embodiment 5 has advantages that the structure is made simpler and the number of parts is reduced as compared with Embodiment 1. On the other hand, the ratio (ejection efficiency) of ions mass-selectively ejected in the trapped ions is higher in Embodiment 1.

Embodiment 6

Figure 13:
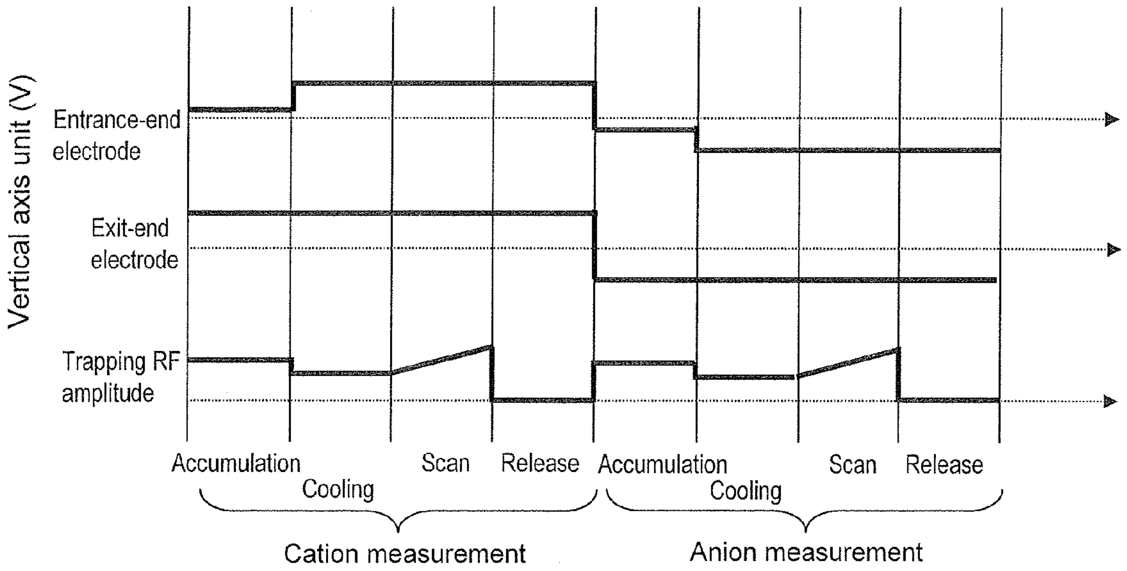
FIG. 13 shows an example of measurement sequences.

An apparatus configuration except the ion trap part 32 and measurement sequences are the same as in Embodiment 1, and thus a description thereof is omitted. The ion trap part 32 is arranged in the high-vacuum chamber 7, has a buffer gas introduced therein, and is maintained at $10^{-6}$ Torr to $10^{-2}$ Torr ($1.3\times10^{-4}$ Pa to 1.3 Pa). FIG. 13 shows measurement sequences in the ion trap part. Hereinbelow, a description is given of voltage application to electrodes at the time of the cation measurement. At the time of the anion measurement, the polarity of voltages to be applied may be inverted.

Figure 12:
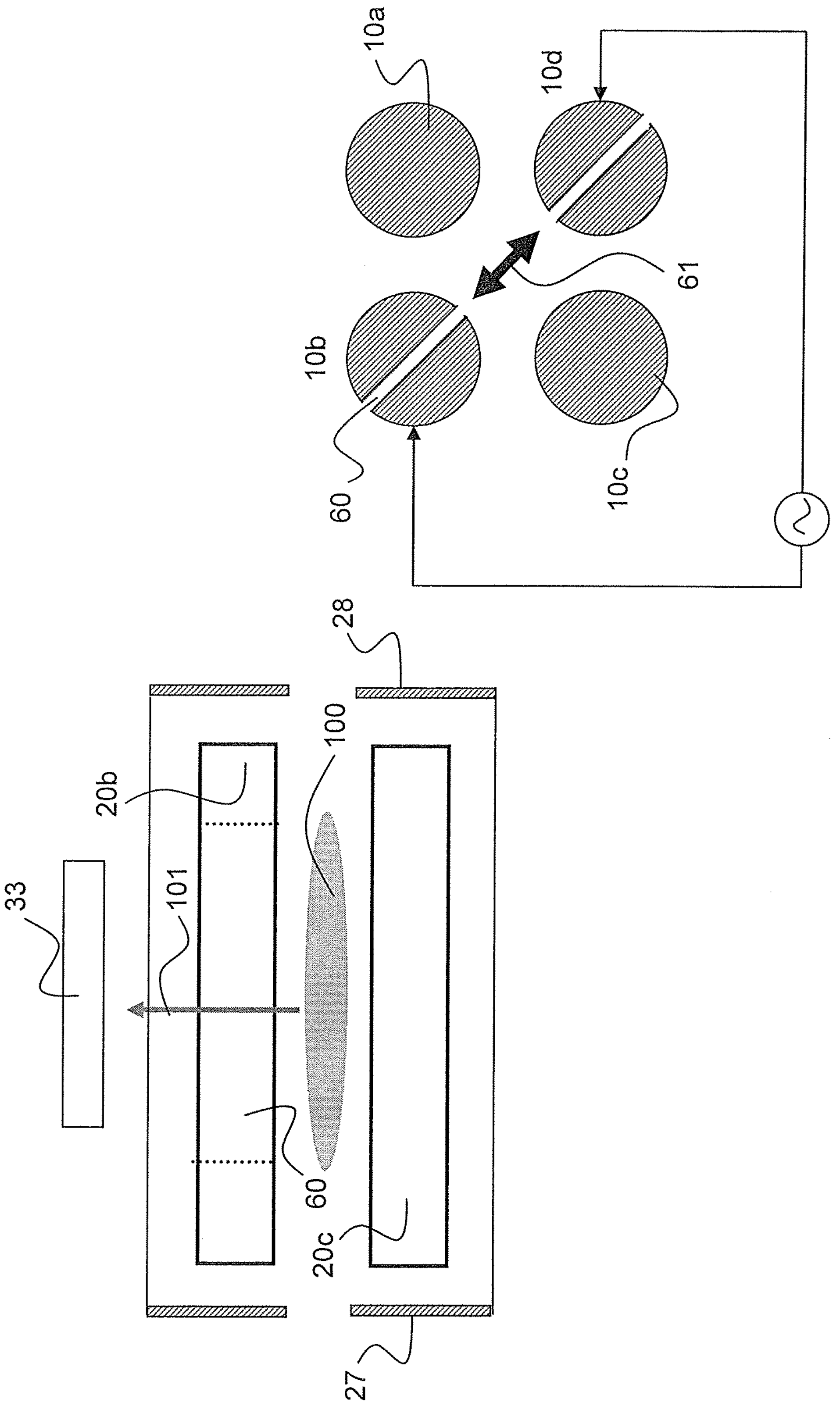
FIG. 12 shows an example of an ion trap part.

In an accumulating step, a trapping RF voltage (having amplitude of 100 V to 5000 V and a frequency of 500 kHz to 2 MHz) is applied to the quadrupole rod electrodes 20. In an example of voltage application to the other electrodes, the entrance-end electrode 27 is set at 5 V to 20 V, and the exit-end electrode 28 is set at 10 V to 50 V. A pseudo-potential is generated in the radial direction of a quadrupole electric field due to the trapping RF voltage, and a DC potential is generated between the entrance-end electrode 27 and the exit-end electrode 28 in the direction of the center axis of the quadrupole electric field. For this reason, introduced ions are trapped in a region 100 surrounded by the entrance-end electrode 27, the quadrupole rod electrodes 20, and the exit-end electrode 28 in Embodiment 5 as shown in FIG. 12. Next, in a mass scanning step, an auxiliary alternating voltage (having amplitude of 5 V to 100 V and a frequency of 10 kHz to 500 kHz) is applied between a pair of mutually opposed ones of the quadrupole rod electrodes.

FIG. 13 shows an example of voltage application to the other electrodes. The entrance-end electrode 27 is set at 10 V to 50 V, and the exit-end electrode 28 is set at approximately 10 V to 50 V. In Embodiment 6, the voltage of the exit-end electrode 28 in the mass scanning step may be the same as a voltage in the accumulating step. Ions excited in the radial direction due to the auxiliary alternating voltage are ejected in the radial direction through slots 60 opened in the quadrupole rod electrodes 2. FIG. 12 schematically shows a trajectory 101 of the ions ejected at this time. The detector 33 is provided outside the quadrupole rod electrodes 20 in this embodiment. By scanning trapping RF voltage amplitude from lower one (100 V to 1000 V) to higher one (500 V to 5000 V), a mass spectrum can be obtained. The duration of a mass scanning time is approximately 10 ms to 200 ms and almost proportional to a range of a mass to be desirably detected. Lastly, the trapping RF voltage is changed to zero in a releasing step to release all the ions to outside the trap. A time of the releasing step is approximately 1 ms.

The configuration in Embodiment 6 has an advantage of high ejection efficiency as compared with Embodiment 1. On the other hand, since Embodiment 1 has smaller energy distribution of ions mass-selectively ejected, Embodiment 1 has higher efficiency of introduction to an ion optical system for a subsequent stage.

Embodiment 7

Figure 14:
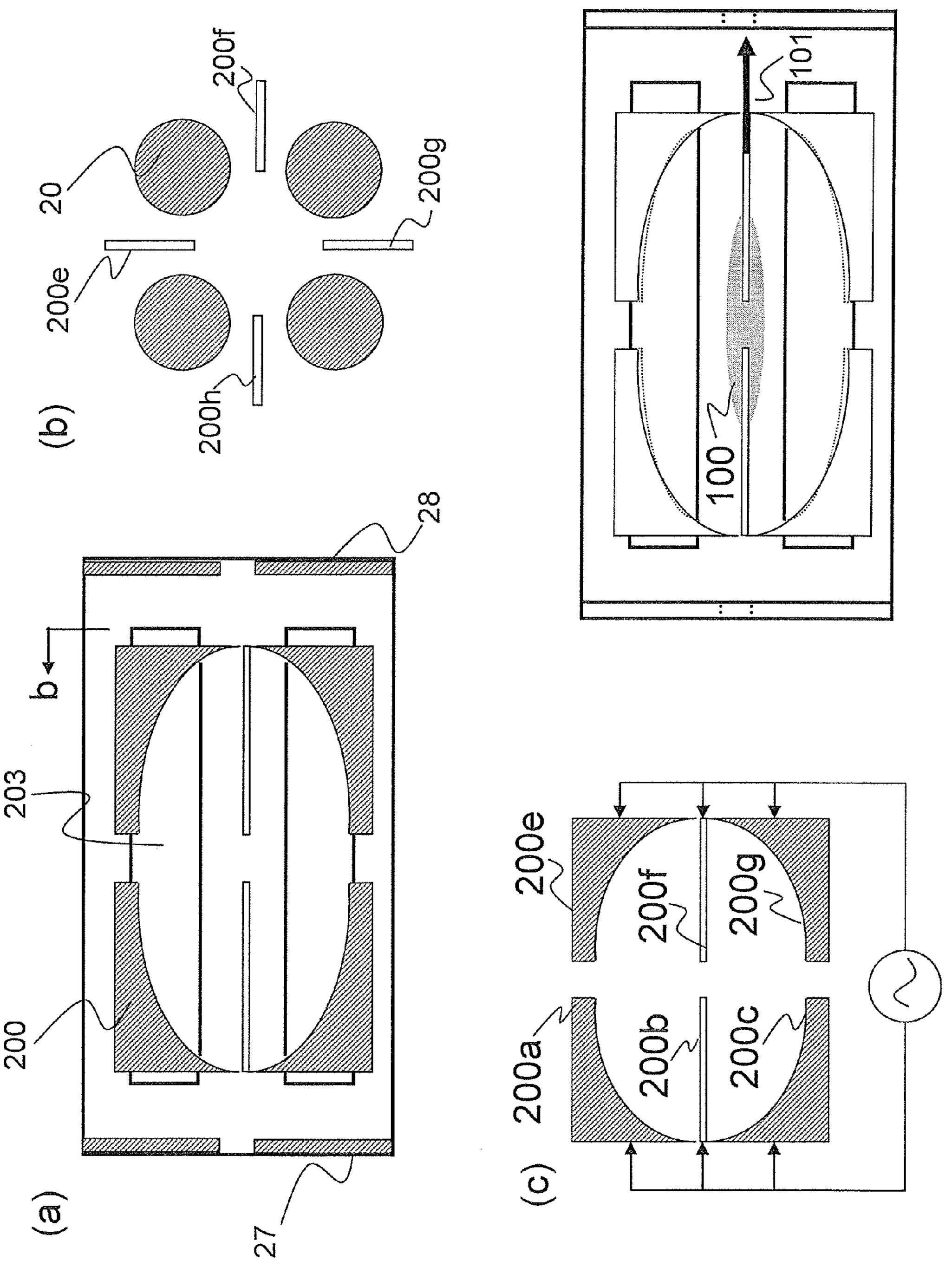
FIG. 14 shows an example of an ion trap part.
Figure 15:
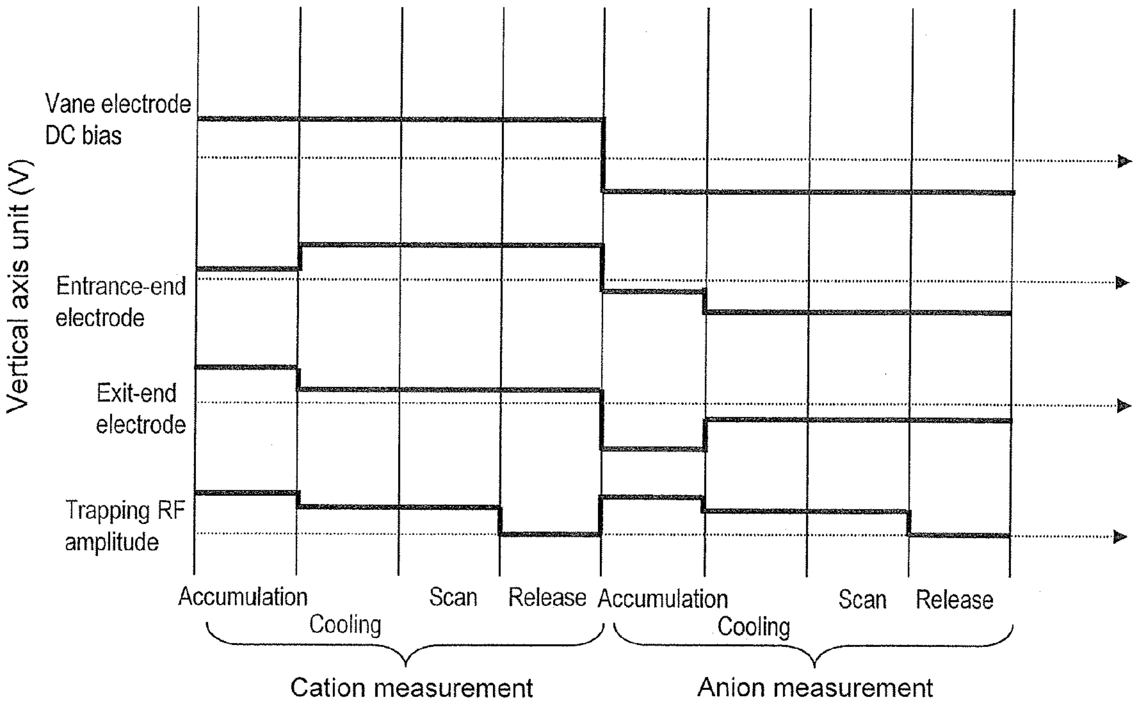
FIG. 15 shows an example of measurement sequences.

FIG. 14 shows an apparatus configuration of the ion trap part 32 in Embodiment 7. The apparatus configuration except the ion trap part 32 and measurement sequences are the same as in Embodiment 1, and thus a description thereof is omitted. The ion trap part 32 includes the entrance-end electrode 27, the exit-end electrode 28, the quadrupole rod electrodes 20, and vane electrodes 200 inserted in gaps between the quadrupole rod electrodes. The vane electrodes 200 use electrodes having such a shape by which a potential on the center axis of the ion trap is optimized. For example, the vane electrodes 200 are recessed to have an arc shape and inserted between the quadruple rod electrodes 203 in such a manner that an arching side of each vane electrode 200 faces the center axis. The vane electrodes 200 are each divided into two in the direction of the center axis (indicating 200*a* and 200*e*, 200*b* and 200*f*, 200*c* and 200*g*, and 200*d* and 200*h*). The ion trap part 32 has buffer gas introduced therein and is maintained at $10^{-4}$ Torr to $10^{-2}$ Torr ($1.3\times10^{-2}$ Pa to 1.3 Pa). FIG. 15 shows measurement sequences in the ion trap part. Hereinbelow, a description is given of voltage application to the electrodes at the time of the cation measurement. At the time of the anion measurement, the polarity of voltages to be applied may be inverted.

In an accumulating step, a trapping RF voltage (having amplitude of 100 V to 5000 V and a frequency of 500 kHz to 2 MHz) is applied to the quadrupole rod electrodes 20. In addition, a direct voltage of 10 V to 100 V is applied to the vane electrodes 200. In an example of voltage application to the other electrodes, the entrance-end electrode 27 is set at 5 V to 20 V, and the exit-end electrode 28 is set at 10 V to 100 V. A pseudo-potential is generated in the radial direction of a quadrupole electric field due to the trapping RF voltage, and a harmonic potential is generated in the direction of the center axis of the quadrupole electric field due to a DC bias between the vane electrodes 200 and the quadrupole rod electrodes 20. For this reason, introduced ions are trapped in a region 100 surrounded by the vane electrodes 200 and the quadrupole rod electrodes 20 in Embodiment 7. Next, in a mass scanning step, an auxiliary alternating voltage (having amplitude of 0.01 V to 1 V and a frequency of 10 kHz to 500 kHz) in addition to the direct voltage (20 V to 300 V) is applied to the vane electrodes 200 so that the phase of the auxiliary alternating voltage can be the same phase in the vane electrodes ((200*a*, 200*b*, 200*c*, and 200*d*) and (200*e*, 200*f*, 200*g*, and 200*h*) in the drawing) which are mutually adjacent and opposed in the radial direction and can be mutually reversed phases in the vane electrodes ((200*a* and 200*e*), (200*b* and 200*f*), (200*c* and 200*g*) and (200*d* and 200*h*)) which are mutually opposed in the axial direction. In an example of voltage application to the other electrodes, the exit-end electrode 28 is set at approximately 0 V to 10 V, and the entrance-end electrode 27 is set at approximately 10 V to 100 V. Ions mass-selectively excited due to the auxiliary alternating voltage are ejected in the axial direction. FIG. 14 schematically shows a trajectory 101 of the ions ejected at this time. By scanning the frequency of the auxiliary alternating voltage from higher one (300 kHz to 500 kHz) to lower one (10 kHz to 50 kHz) or from the lower one to the higher one, a mass spectrum can be obtained. A time of the mass scanning step is approximately 10 ms to 200 ms and almost proportional to a range of a mass to be desirably detected. Lastly, the trapping RF voltage is changed to zero in a releasing step to release all the ions to outside the trap. A time of the releasing step is approximately 1 ms.

The configuration in Embodiment 7 has an advantage of higher ejection efficiency than in Embodiment 1. On the other hand, the number of ions that can be trapped at a time is larger in Embodiment 1.

Embodiment 8

Figure 16:
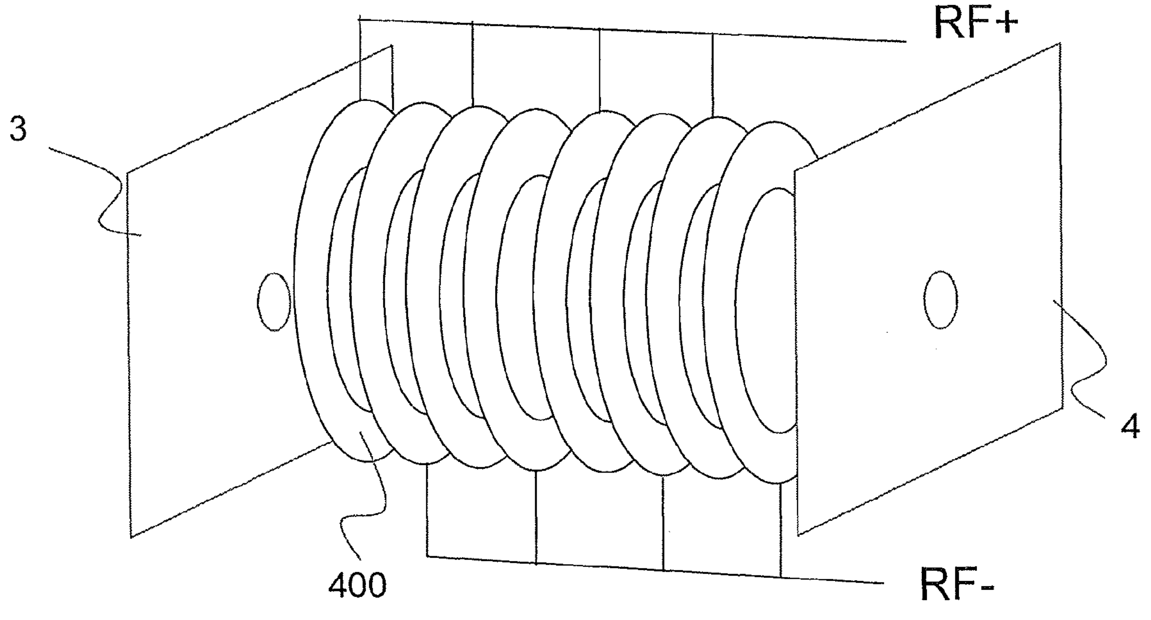
FIG. 16 shows an example of an ion guide part.
Figure 17:
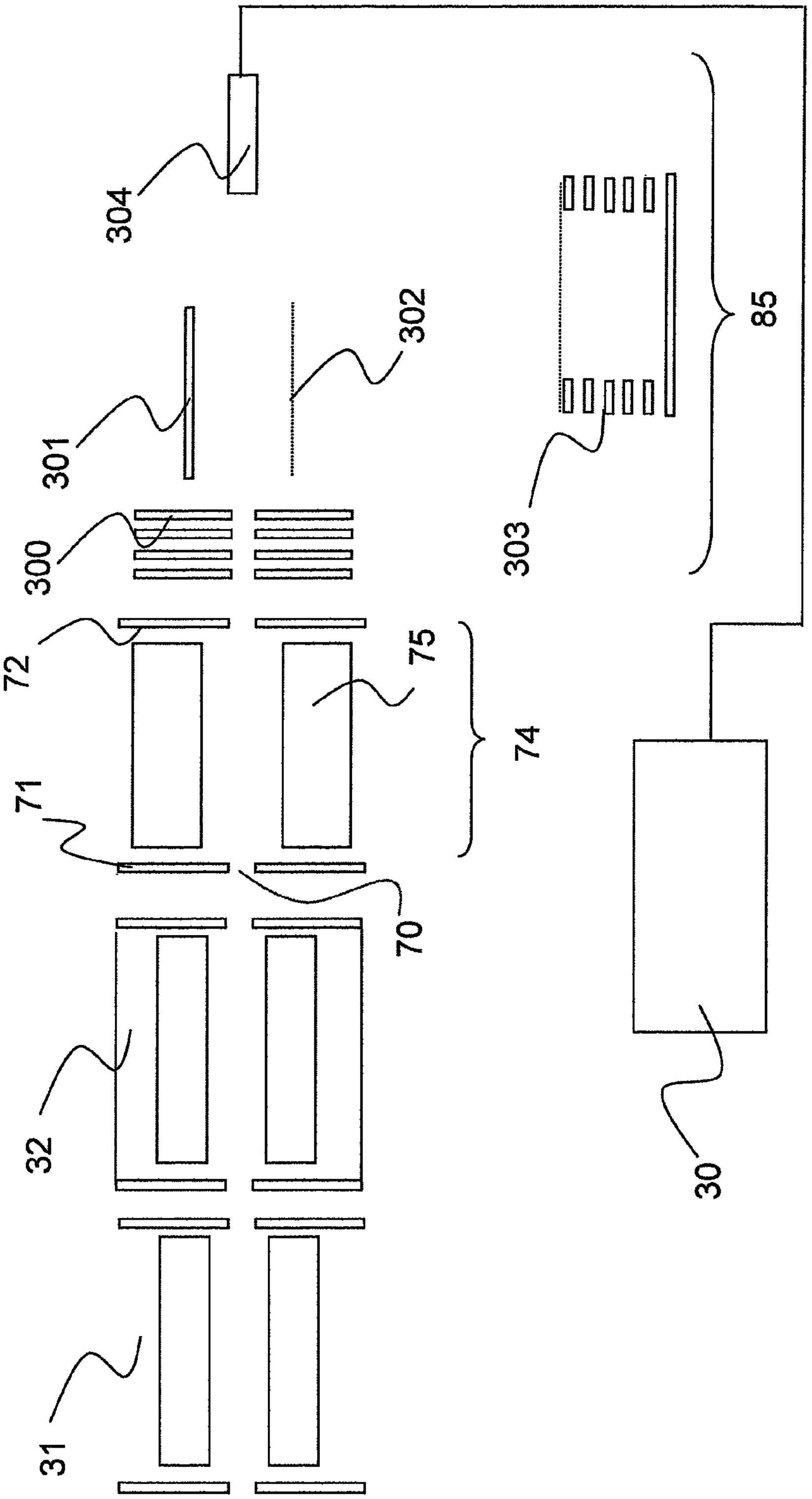
FIG. 17 shows an example of a configuration of a mass spectrometer.

FIG. 16 shows a configuration of the ion guide part 31 in Embodiment 8. An apparatus configuration except the ion guide part 31 and measurement sequences are the same as in Embodiment 1, and thus a description thereof is omitted. The pressure in the ion guide part 31 is maintained at approximately $10^{-4}$ Torr to $10^{-2}$ Torr ($1.3\times10^{-2}$ Pa to 1.3 Pa). The ion guide part 32 in Embodiment 8 has a configuration in which two or more ring electrodes 400, instead of the quadrupole rods in the ion guide part in Embodiment 1, are arranged in such a manner that the center of the rings is coaxial. When an RF voltage is applied so that mutually adjacent ones of the ring electrodes 400 can have mutually reversed RF voltage phases, a force causing ion convergence is generated on the center axis of the ion guide part 31. By independently applying DC voltages to the respective ring electrodes, any electric field can be generated on the center axis of the ion guide part. In an example of generating the electric field on the center axis, the DC voltages to be applied to the ring electrodes 400 are set in such a manner that a higher voltage is applied to each of the electrodes near the entrance-end electrode 3 and a lower voltage is applied to one closer to the exit-end electrode 4 serially. Thereby, the same effect as in the configuration (A) in Embodiment 1 can be obtained.

The configuration in Embodiment 8 has an advantage that ions in a larger mass range can be efficiently accumulated and transmitted than in the configuration in Embodiment 1. On the other hand, the structure is simpler and the number of parts is smaller in Embodiment 1.

Embodiment 9

An apparatus configuration from the ion source 1 to the ion trap part 32 and measurement sequences are the same as in Embodiment 1, and thus a description thereof is omitted. In Embodiment 9, ions mass-selectively ejected from the ion trap part 32 are introduced into a collision dissociation part 74. The collision dissociation part 74 is formed by an entrance-end electrode 71, multipole rod electrodes 75, an exit-end electrode 72 and has nitrogen, Ar or the like of approximately 1 mTorr to 30 mTorr (0.13 Pa to 4 Pa) introduced therein. Ions introduced from an orifice 70 are dissociated in the collision dissociation part 74. At this time, setting a potential difference between an offset potential of the ion guide part 32 and an offset potential of the multipole rod electrodes 75 at approximately 20 V to 100 V allows the collision dissociation to proceed efficiently. Fragment ions generated by the dissociation are introduced into a time-of-flight mass spectrometer part 85. The time-of-flight mass spectrometer part is maintained at $10^{-6}$ Torr or lower ($1.3\times10^{-4}$ Pa or lower). Note that a collision dissociation chamber formed by four rod-shaped electrodes is illustrated in this embodiment, but the number of the rod electrodes may be six, eight, ten or more. Alternatively, a configuration may be employed in which a number of lens-shaped electrodes are arranged and RF voltages having different phases are respectively applied to the electrodes.

The time-of-flight mass spectrometer part 85 includes ion lenses 300, a repeller electrode 301, an extraction electrode 302, reflection lenses 303, and a detector 304. Ions introduced into the time-of-flight spectrometer part result in ion conversion due to the ion lenses 300 including multiple electrodes, and then are introduced into an acceleration section of the time-of-flight spectrometer part, the acceleration section including the repeller electrode 301 and the lead-in electrode 302. By applying a voltage of several hundred volts to several kilovolts between the repeller electrode 301 and the extraction electrode 302 by a power source of the acceleration section, the ions are accelerated in an ion introducing direction and a straight direction. The ions accelerated in the straight direction straightly reach the detector, or are deflected through the reflection lenses called reflectrons and thereafter reach the detector 304 formed of MCPs or the like. The mass number of ions can be measured from a relation between a start time of the acceleration in the acceleration section and an ion detection time.

Although the quadrupole ion guide is used as the ion guide part 31 in Embodiments 1 to 9, a multipole electrode other than the quadrupole, for example, a hexapole, an octpole, a tripole, or the like may be used. In addition, the ion trap part 32 may be a three-dimensional quadrupole ion trap. It is apparent that the present invention can be carried out in a mode other than ones particularly described in the aforementioned descriptions and embodiments. Thus, a lot of changes and modifications can be made to the present invention, and thus are within the scope of claims attached to the present case.

EXPLANATION OF THE REFERENCE NUMERALS

1 . . . ion source, 2 . . . first orifice, 3 . . . entrance-end electrode of ion guide part, 4 . . . exit-end electrode of ion guide part, 5 . . . first differential exhaust unit, 6 . . . second differential exhaust unit, 7 . . . high-vacuum chamber, 30 . . . controller, 31 . . . ion guide part, 32 . . . ion trap part, 33 . . . detector, 40 . . . vacuum pump, 41 . . . vacuum pump, 42 . . . vacuum pump, 10 . . . quadrupole rod electrode of ion guide part, 11 . . . vane electrode, 27 . . . entrance-end electrode of ion trap part, 28 . . . exit-end electrode of ion trap part, 21 . . . vane electrode, 24 . . . trap wire electrode, 25 . . . extraction wire electrode, 100 . . . region where ions are trapped, 101 . . . trajectory of mass-selectively ejected ions, 60 . . . slot, 61 . . . fringing field, 200 . . . vane electrode, 400 . . . ring electrode, 70 . . . orifice, 71 . . . entrance-end electrode, 72 . . . exit-end electrode, 74 . . . collision dissociation part, 75 . . . quadrupole rod electrode, 300 . . . ion lens, 301 . . . repeller electrode, 302 . . . extraction electrode, 303 . . . reflector, 304 . . . detector

The invention claimed is:

1. A mass spectrometer, comprising:
- an ion source configured to generate ions;
- an ion guide part configured to transport the ions introduced from the ion source;
- an ion trap part configured to trap and mass-selectively eject the ions introduced from the ion guide part;
- a detector configured to detect the ions ejected from the ion trap part; and
- a controller,
- wherein based on voltage control performed on the ion guide part and the ion trap part, the controller introduces ions having a polarity reverse to that of the ions trapped in the ion trap part into the ion guide part and causes the ions having the reverse polarity to be trapped into the ion guide part in a time period when the ions are mass-selectively ejected from the ion trap part.

2. The mass spectrometer according to claim 1, wherein the ion guide part is a multipole ion guide comprising multipole rod electrodes.

3. The mass spectrometer according to claim 2, wherein the ion guide part comprises quadrupole rod electrodes, and
- a static voltage is applied so that mutually opposed ones of the rod electrodes have the same polarity and mutually adjacent ones of the rod electrodes have mutually reversed polarities.

4. The mass spectrometer according to claim 2, comprising
- vane electrodes to which a DC voltage is applied between the multipole rod electrodes, wherein a distance between an end face of each of the vane electrodes and a center axis of the multipole rod electrodes is longer on an exit side of the introduced ions than on an entrance side thereof.

5. The mass spectrometer according to claim 1, comprising an electrode for controlling ion passage, between the ion guide part and the ion trap part.

6. The mass spectrometer according to claim 5, wherein the controller sets a potential of the electrode for controlling the ion passage so that polarities of an offset potential of the multipole rod electrode of the ion guide part and an offset potential of the ion trap are reverse to each other.

7. The mass spectrometer according to claim 5, wherein an alternating voltage is applied to the electrode for controlling the ion passage.

8. The mass spectrometer according to claim 7, wherein the controller sets a magnitude of a pseudo-potential to be lower than an offset potential of the ion guide part and to be higher than an offset potential of the ion trap part, the pseudo-potential being generated on the electrode for controlling the ion passage due to the alternating voltage.

9. The mass spectrometer according to claim 1, wherein the controller applies mutually reversed voltages to a first electrode adjacent to the ion guide part and a second electrode adjacent to the ion trap part, respectively, which are between the ion guide part and the ion trap part.

10. The mass spectrometer according to claim 1, wherein the ion trap part comprises a multipole electrode, a slot is formed in the multipole rod electrode in a radial direction of the rod electrode, and the controller applies an auxiliary alternating voltage to the rod electrode to cause ions to be excited in the radial direction and thereby to be ejected.

11. The mass spectrometer according to claim 1, wherein
- the ion trap part comprises quadrupole rod electrodes and vane electrodes each provided between mutually adjacent rod electrodes of the quadrupole rod electrodes on an entrance side and an exit side for the ions of the ion trap part, and
- each of the vane electrodes is formed in such a manner that end portions, of the vane electrode, on the entrance side and the exit side have a shorter distance from the center of rods of the quadrupoles than a center portion thereof does.

12. The mass spectrometer according to claim 1, wherein the ion guide part comprises a plurality of ring electrodes, and an RF voltage is applied thereto so that mutually adjacent ring electrodes have mutually reversed phases.

13. The mass spectrometer according to claim 1, comprising an ion dissociation part between the ion trap part and the detector.

14. A mass spectrometry method using a mass spectrometer including an ion source, an ion guide configured to transport ions, and an ion trap configured to trap the ions from the ion guide, comprising:
- introducing first ions into the ion guide from the ion source;
- introducing the first ions into the ion trap from the ion guide;
- ejecting the first ions from the ion trap and analyzing the first ions; and
- accumulating second ions having a reverse polarity to that of the first ions, in the ion guide in the ejecting and analyzing step, and causing the second ions to be trapped into the ion guide.

15. The mass spectrometry method according to claim 14, wherein
- switching of a polarity of the ion source is performed when the ions introduced into the ion guide are cooled.

16. The mass spectrometry method according to claim 14, further comprising:

introducing the first ions into the ion trap; and introducing ions into the ion trap from the ion source.

17. The mass spectrometry method according to claim 14, wherein an electrode for controlling ion passage which is provided between the ion guide and the ion trap is used, polarities of an offset potential of the ion guide part and an offset potential of the ion trap are thus made reverse to each other with respect to the potential of the electrode for controlling the ion passage, and thereby the first ions are introduced into the ion trap from the ion guide.

18. The mass spectrometry method according to claim 14, wherein an alternating voltage is applied to an electrode for controlling the ion passage which is provided between the ion guide and the ion trap, a magnitude of a pseudo-potential thus generated is set to be lower than an offset potential of the ion guide and higher than an offset potential of the ion trap, and thereby the first ions are introduced into the ion trap from the ion guide.

19. The mass spectrometry method according to claim 14, wherein mutually reversed voltages are respectively applied to a first electrode adjacent to the ion guide and a second electrode adjacent to the ion trap, the first and second electrodes being provided between the ion guide and the ion trap, and thereby the ions are introduced into the ion trap from the ion guide.

20. The mass spectrometry method according to claim 14, wherein the ion trap comprises a quadrupole rod electrode and an exit-end electrode configured to eject the ions and ejects the ions resonantly excited in a radial direction due to a fringing field generated between the exit-end electrode and the quadrupole rod electrode.

* * * * *